Nov. 27, 1928. 1,693,012
J. K. WRIGHT
TRUNK, FOLDABLE BED SUPPORTING STRUCTURE, AND CANOPY
Filed July 1, 1926  3 Sheets-Sheet 2

INVENTOR.
John K. Wright
BY Watson E. Coleman
ATTORNEY.

Nov. 27, 1928.
J. K. WRIGHT
1,693,012
TRUNK, FOLDABLE BED SUPPORTING STRUCTURE, AND CANOPY
Filed July 1, 1926  3 Sheets-Sheet 3
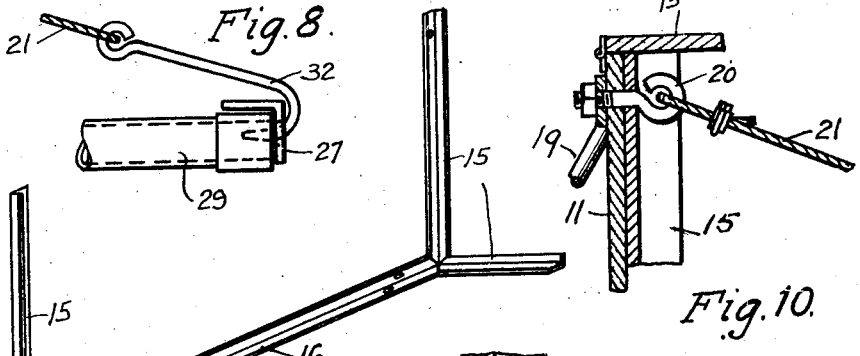
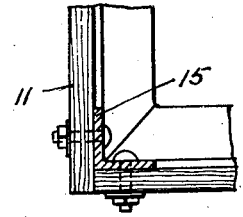
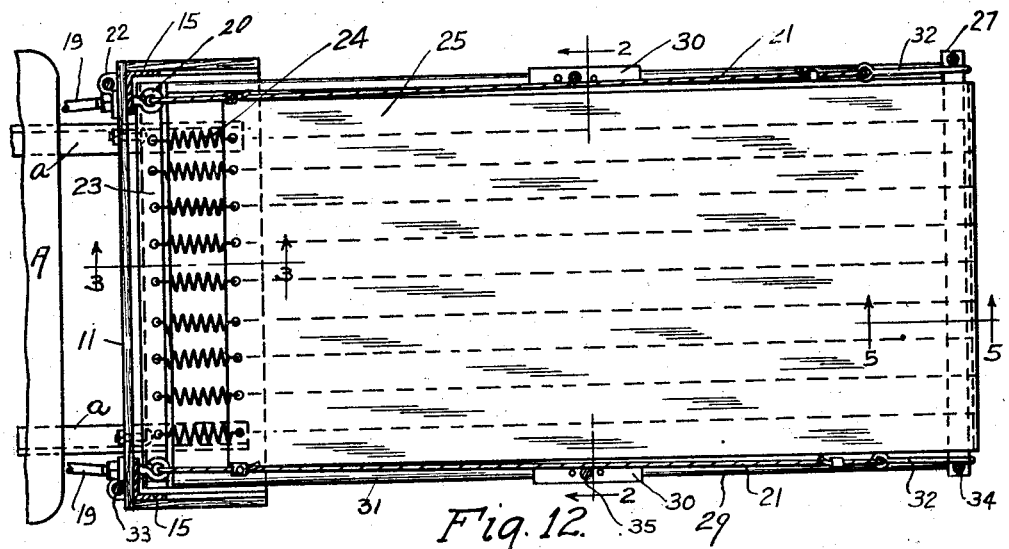
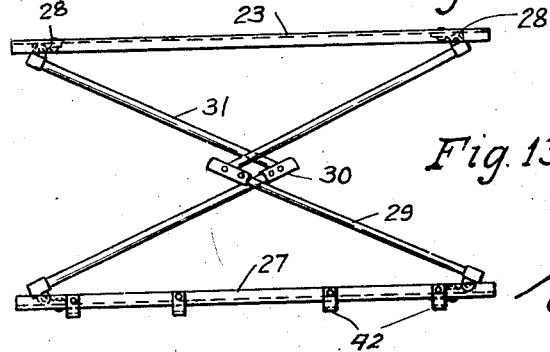
INVENTOR.
John K. Wright
BY Watson E. Coleman
ATTORNEY.

Patented Nov. 27, 1928.

1,693,012

UNITED STATES PATENT OFFICE.

JOHN K. WRIGHT, OF DENVER, COLORADO.

TRUNK, FOLDABLE BED-SUPPORTING STRUCTURE, AND CANOPY.

Application filed July 1, 1926. Serial No. 119,935.

The invention relates to folding bed constructions designed to be used in connection with automobiles or other vehicles.

The general object of the invention is to provide a trunk which may be readily mounted upon an automobile or other vehicle and which contains a foldable bed, a foldable supporting structure therefor, and a foldable canopy or tent, all of which when not in use may be packed within the trunk but which when in use is extended rearward from the automobile.

A further object is to provide a bed supporting structure for automobiles or other vehicles which is supported upon the rear end of the automobile frame and which does not necessitate the use of legs for supporting the rear end of the bed supporting structure.

A still further object is to provide means whereby the supporting frame for the canopy may be formed in sections adapted to be readily set up or taken down and packed.

Other objects have to do with the details of construction and arrangement of parts to appear more fully hereinafter.

My invention is illustrated in the accompanying drawings wherein:—

Fig. 8 is a fragmentary side view of the bed frame and one of the cable hooks;

Fig. 9 is a perspective view of the angle iron frame of the trunk;

Fig. 10 is a fragmentary sectional view through the upper end of the trunk;

Fig. 11 is a plan view of the trunk at one of the corners, the angle iron being in section;

Fig. 12 is a top plan view of the bed supporting structure and the bed in extended position;

Fig. 13 is a top plan view of the framework of the bed partially folded.

Fig. 14 is a perspective view of one of the beveled washers.

Figure 1:
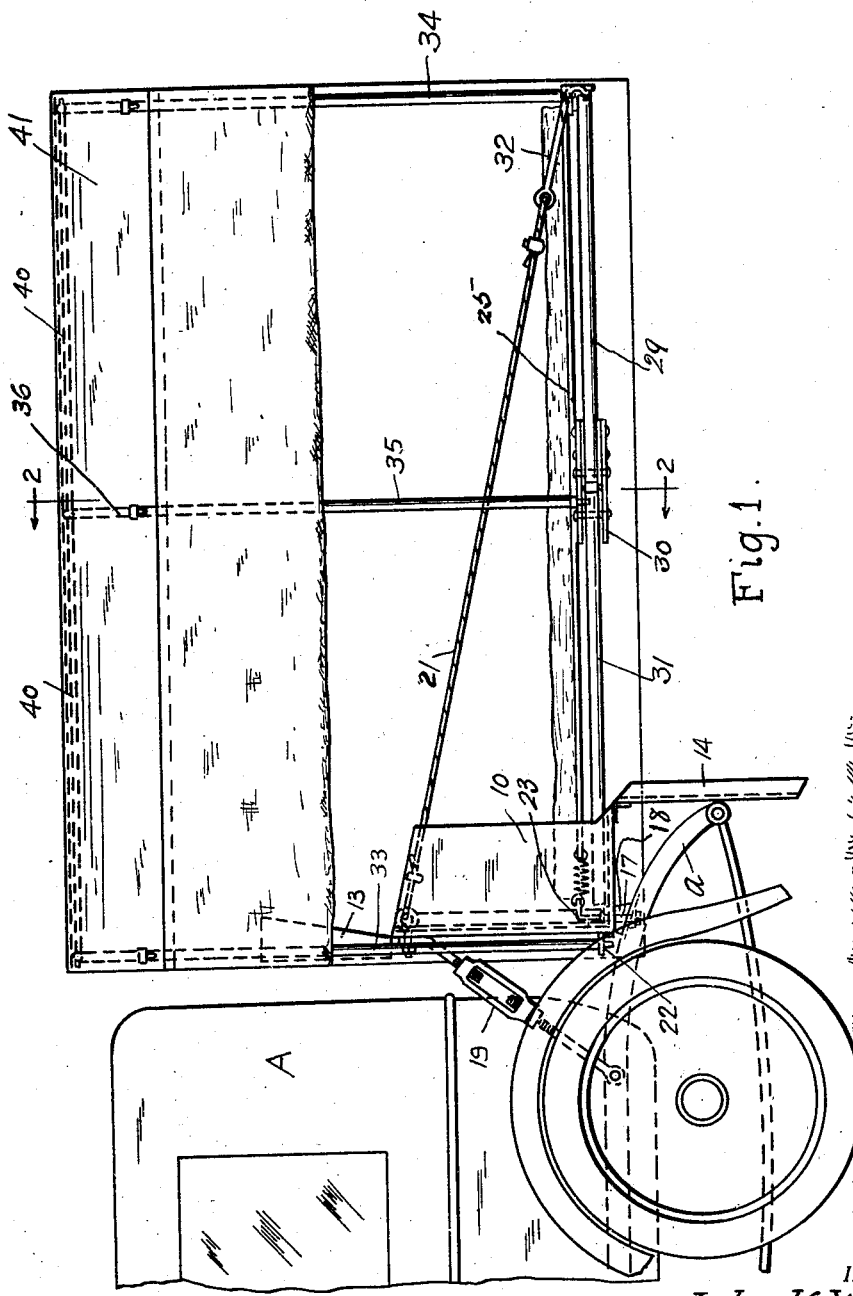
Figure 1 is a side elevation of the rear end of an automobile with my bed supporting structure applied thereto.

In Figure 1 I have illustrated the rear end of an automobile A having the rearwardly extending and downwardly curved supporting elements $a$. Mounted upon the rearwardly projecting portions of these supporting elements $a$ rearward of the body A is a trunk which I have designated generally 10. This trunk has a rear wall 11, a bottom 12, a hinged top 13, and a hinged front wall 14. When not in use, the wall 14 is closed up against the front of the trunk while the top is lowered and thus the contents of the trunk are protected from the weather. In use the parts 13 and 14 are positioned as illustrated in Figure 1. The trunk is braced by means of the angle iron braces 15, shown in Figure 9. The transversely extending member 16 of this frame 15 is formed with boltholes in its horizontal flange through which bolts 17 pass, these bolts extending through beveled washers 18, see Figure 14, and extending through the frame beams $a$ of the automobile. Thus the rear end of the box is supported upon these frame beams or channel irons $a$. This, of course, would not afford sufficient support for the trunk or for the bed extended and hence I provide the braces or stays 19 as shown in Figure 1, each being formed in two sections connected by a turnbuckle. The upper end of each stay is angularly bent for the passage of an eye bolt 20, see Figure 10. These eye bolts pass through perforations in the upper ends of the vertical angle irons of the frame 15 and attached to these eye bolts are the cables or flexible connections 21, see Figure 9, which extend downward and rearward and engage with the extremity of the bed supporting frame.

Figure 4:
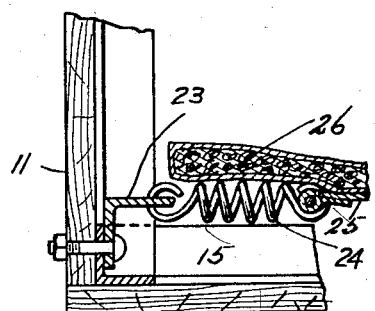
Fig. 4 is an enlarged fragmentary sectional view through the forward corner of the trunk and illustrating a portion of the bed.
Figure 5:
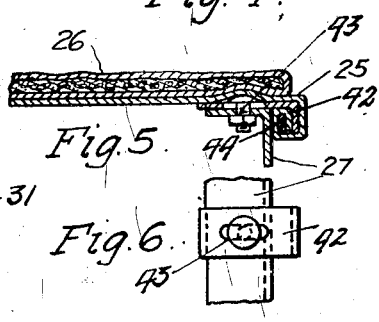
Fig. 5 is a section of the rear end of one of the bed supporting elements showing the manner in which the rear end of the bed is engaged therewith, the section being taken on the line 5—5 of Figure 12.

Also bolted to the rear wall or back wall of the trunk 10 are a pair of lower eyes 22 designed to support the forward bow of the canopy as will be later described. Bolted to the angle iron frame 15 and disposed against the rear wall of the trunk 10 and extending transversely across this rear wall is an angle iron 23, see Figure 4, this angle iron being disposed adjacent the bottom of the trunk and having its horizontal flange spaced from the bottom of the trunk. Engaged with this horizontal flange are a plurality of coiled springs 24 which are engaged with a canvas sheet 25 which constitutes the bed proper and supports, if necessary, a mattress 26, see Figure 5. The free edge of this sheet is formed as shown in Figure 5, so as to engage with a transversely extending angle iron 27. The angle iron 27 is extended beyond the canvas as shown in Figure 12, and apertured for the ends of a vertically extending rear bow as will be later described. The angle iron 27 and the angle iron 23 are pivotally engaged with the side bars of the bed as illustrated in Figure 13. To this end, the angle irons 23 and 27 are provided with outwardly projecting ears 28.

Pivoted to the forward ears are the tubular rods 29 which carry upon their extremities and attached thereto, the channel iron members 30. Pivoted to these channel iron members 30 are the tubular bars 31 which in turn are pivoted to the ears 28 of the rear angle iron 23. It will thus be seen that when these rods or bars 29 and 31 are turned into aligned position, the bed frame will form parallel side members which will act to stretch the canvas of the bed and that when the joints between the members 31 and 29 are broken, as shown in Figure 13, the two angle irons 23 and 27 may be brought into close relation and the members 29 and 31 and 23 and 27 will be parallel. Thus the bed supporting structure may be folded into small compass for insertion within the trunk.

Figure 2:
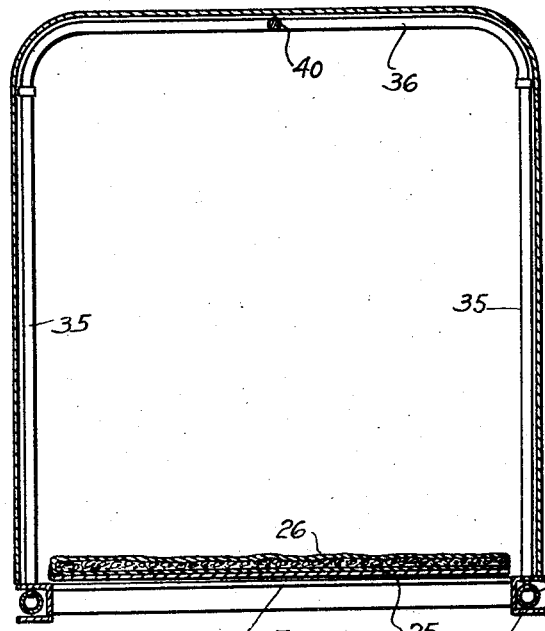
Fig. 2 is a section on the line 2—2 of Figure 12.
Figure 7:
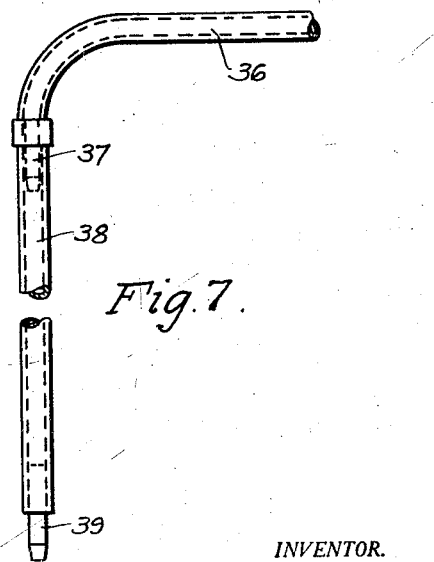
Fig. 7 is a fragmentary elevation of the canopy supporting structure.

The forward ends of the flexible cables 21 are provided with hooks 32 which engage in the forward ends of the tubular sections 29 when the bed frame is expanded, thus acting to support the bed supporting structure in the manner shown in Figure 1. The channel irons 30 which constitute the means whereby the tubular members 29 and 31 are connected, are each formed with an aperture for engagement by a middle bow. There are three of these bows which support the canopy of tent. The forward bow is designated 33, the rear bow is designated 34, and the middle bow 35. Each of these bows is formed as illustrated in Figures 2 and 7, of three sections. There is a transverse section 36 having downwardly turned ends terminating in vertically disposed pins 37. These pins are insertible into the uprights 38 of the bow as shown in Figure 7 and the lower end of each upright 38 is formed with a vertically extending pin 39 which is adapted to be received in the corresponding aperture in the supporting structure. Thus, the rear bow has the pins 39 disposed in apertures in the angle iron 27. The middle bow has its pins 39 disposed in apertures in the channel-shaped coupling members 30, while the forward bow has its pins 39 disposed in the sockets 22 which are carried upon the trunk. Between bows at the top, a small longitudinally extending rod is used, designated 40 which keeps the bow at the proper distance.

Adapted to extend entirely over the bows is the canopy or tent designated generally 41. This may have a front wall and a rear wall and the side walls. The side walls, as shown in Figure 1, are separated from the end walls so that the side walls may be turned upward or raised and held in this raised position to any height required. The rear wall is preferably made so that it may be opened to permit ingress or egress.

Figure 6:
Fig. 6 is a fragmentary plan view of the cross bar 27 and one of the bed clips.

While I do not wish to be limited to any particular means for engaging the free end of the canvas with the transverse angle iron 27, I have illustrated a plurality of clips 42 in Figures 5 and 6 as being mounted upon the angle iron 27, these clips being hook-shaped and being adjustable by means of the bolts 43. The extremity of the canvas 25 is engaged around these clips in any suitable manner and the canvas is held by means of the wedge 44. The particular manner of connecting the canvas to the angle iron 27 forms no part of my invention.

Figure 3:
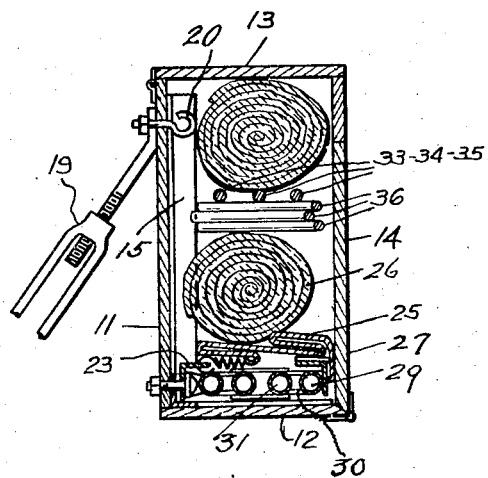
Fig. 3 is a vertical sectional view through the truck, showing the bed, the canopy, and the bed supporting structure folded up within the trunk, the section being taken on the line 3—3 of Figure 12.

The construction which I have described provides a bed supporting structure which may be readily applied to the usual supporting frame of an automobile and readily detached therefrom and which supports the bed when opened or expanded entirely out of contact with the ground, thus reducing the possibility of any small animal climbing upon the bed when it is opened. The bed structure may be readily packed or unpacked and when the bed structure is folded up within the trunk, as shown in Figure 3, there will be considerable room which may be used for clothes or other necessaries. In packing up, the bed or canopy is first removed from the bows and folded or rolled. The bows are then removed and separated into their several sections. The mattress is then rolled up and the mattress supporting rods are folded in the manner illustrated in Figure 11 and the canvas folded up as shown in Figure 3. The longitudinal bars 29 and 31 when folded up, are disposed in the bottom of the trunk, the canvas 25 is folded upon these bars, the bedding roll, that is the mattress with its bed clothes, is rolled up and disposed upon the canvas, the sections of the bows are then placed within the trunk on top of the bedding roll, and the canopy or tent folded or rolled, is placed within the top of the trunk. The structure when unfolded or opened out as shown in Figure 1, provides a comfortable bed having a width nearly equal to that of the automobile body which is entirely protected by the canopy. This bed structure is resiliently supported by the same springs which support the body.

I do not wish to be limited to the particular form of bed which I have illustrated as other forms might be used and the canvas may be engaged with the end angle irons or with the lateral bars in any suitable manner. Obviously, many of the details of construction and arrangement of parts might be modified without departing from the spirit of the invention as defined in the appended claims.

I claim:—

1. A bed supporting attachment for automobiles comprising a trunk having a vertical forward wall, a transverse angle iron, and vertical angle irons at the lower edge and ends of said wall and attached thereto, means whereby the trunk may be engaged with the chassis of an automobile, a transversely extending bed supporting angle iron disposed within the trunk adjacent the bottom thereof and attached thereto, longitudinally extending forward bed supporting bars pivoted to the ends of the last named angle iron and adapted to extend forward therefrom, a rear angle iron, rear bed supporting bars pivoted to the ends thereof and having tubular extremities, means pivotally connecting the rear pair of bed supporting bars to the forward pair, a bed engaged with the bed supporting angle iron and adapted to be detachably engaged with the rear angle iron, braces pivotally connected to the upper ends of the vertical irons of the wall and extending downward and forward therefrom to the chassis of the automobile, and cables having their forward ends engaged with said vertical angle irons and having hooks on their rear ends engaging in the tubular terminal ends of the rear bed supporting bars.

2. The combination with an automobile having rearwardly extending frame members, of a trunk mounted upon said frame members rearward of the body of the automobile, downwardly and forwardly extending braces connecting the top of the trunk to said frame members, and a foldable bed structure mounted within the trunk and including flexible elements connecting the outer extremities of the bed structure with the top of the trunk and entirely supporting the rear end of the bed structure when the latter is unfolded.

3. A bed supporting structure for automobiles comprising a trunk adapted to be supported upon the chassis of an automobile rearward of the body thereof, bed supporting bars formed of sections foldable in horizontal planes and operatively engaged at their forward ends with the trunk and adapted to be folded therewithin parallel to the back of the trunk and when unfolded to extend forward therefrom, a bed carried by said supporting bars and foldable into the trunk independently of the supporting bars therefor, flexible connections from the upper end of the trunk to the rear ends of said bed supporting bars and detachably engaged therewith and acting as the sole support for the rear end of the bed supporting bars when the latter are unfolded, and longitudinally adjustable braces connected to the upper end of the trunk and extending downward and forward therefrom and adapted to be connected to the chassis of the automobile.

In testimony whereof I hereunto affix my signature.

JOHN K. WRIGHT.